United States Patent [19]

Byerly

[11] 4,267,881
[45] May 19, 1981

[54] HEAT STORAGE SINK

[76] Inventor: Cecil W. Byerly, R.R. 2, Box 917, Waukee, Iowa 50263

[21] Appl. No.: 958,674

[22] Filed: Nov. 8, 1978

[51] Int. Cl.³ .............................................. F28D 21/00
[52] U.S. Cl. ...................................... 165/45; 126/436
[58] Field of Search ....................... 165/2, 45; 62/260; 126/436, 430

[56] References Cited

U.S. PATENT DOCUMENTS 3,339,629  9/1967  Hervey .................................. 165/45
4,024,910  5/1977  Werner .................................. 165/45

Primary Examiner—Donald F. Norton
Attorney, Agent, or Firm—Zarley, McKee, Thomte, Voorhees & Sease

[57] ABSTRACT

A storage system for heat and cold exchange with a fluid from a solar collector. The system comprises a large block of earth material which is defined at its outer perimeter by a trench. The block of earth material has an outer zone of vertically downwardly extending channels into the block of earth material and an associated inner zone of vertically downwardly extending channels into the block of earth material. Each of the channels holds a conduit for passage of heat exchange fluid to provide heat exchange between the fluid and the block of earth material. The earth is used for storage of heat from a solar collector. The invention also relates to a manner of use of the heat storage system wherein heat which is withdrawn from the system is selectively withdrawn from the outer zone of vertical channels in order to provide more efficient heat withdrawal and storage.

4 Claims, 4 Drawing Figures

HEAT STORAGE SINK

BACKGROUND OF THE INVENTION

This invention relates to a storage system for heat and cold which utilizes the natural storage capabilities of the soil. The system is primarily adapted for use with solar collectors of the type which provide for heat exchange in the collector between solar radiation and a heat exchange fluid passing through the collector.

One of the problems with solar heat collection systems is that when potential collection is greatest, need is none or minimal and no economical use of the surplus heat has been available, so as to have summer collected heat available for winter use. Expensive storage structures and more expensive insulation materials have made such storing generally uneconomical.

This invention relates primarily to a heat storage sink and method which utilizes the natural heat storage value of the soil. More particularly, the natural heat storage value of soil is utilized in a manner which promotes greater heating efficiency by continual selective withdrawal of heat from a perimeter zone, which is described hereinafter.

Accordingly, the primary object of this invention is to provide a new and efficient heat storage sink so that the entire annual heat requirement may be supplied by the system at low cost.

Another object of this invention is to provide a new and efficient heat storage sink which is economical of manufacture in that it utilizes as the primary storage sink earth material.

Yet another object of this invention is to provide a method of heat storage, and withdrawal from earth material such that the storage capabilities of the earth can be most efficiently maximized to minimize heat loss.

The method of accomplishing each of the above objects as well as others will become apparent from the detailed description of the invention.

SUMMARY OF THE INVENTION

The invention relates to a heat storage sink which employs a large block of earthen material having a top surface, vertical side walls which are defined by a perimeter trench, an outer zone of vertical channels extending into the block of earth material, an inner zone of vertical channels extending into the block of earth material with each of said inner and outer channels holding a conduit for passage of heat exchange fluid therethrough in order to provide heat exchange between the fluid and a block of earth material.

The method of the invention provides for selective withdrawal of heat, initially from the perimeter or outer zone of vertical channels so that heat will be transferred from the inner hotter zone of the block of earth material always to the outer zone. In this manner heat loss is minimized and storage efficiency is increased.

DETAILED DESCRIPTION OF THE INVENTION

Figure 2:
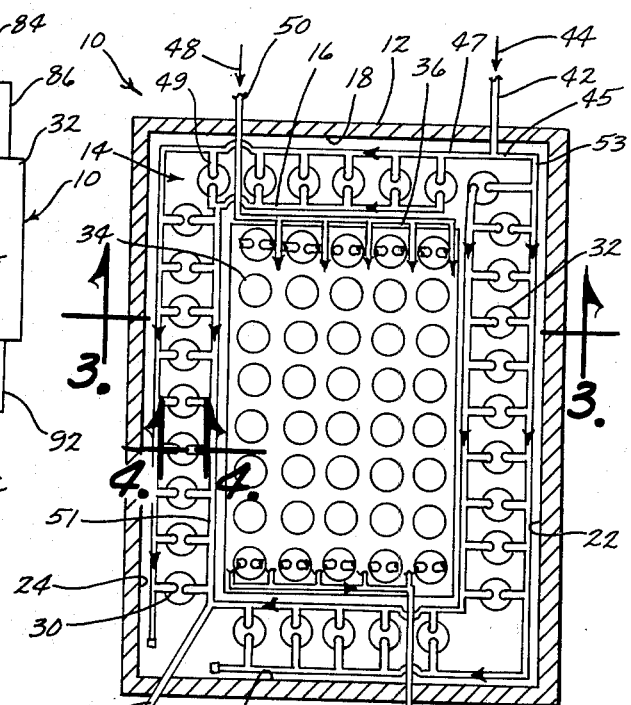
FIG. 2 is a plan view of the heat storage sink showing schematically flow paths through the system.
Figure 3:
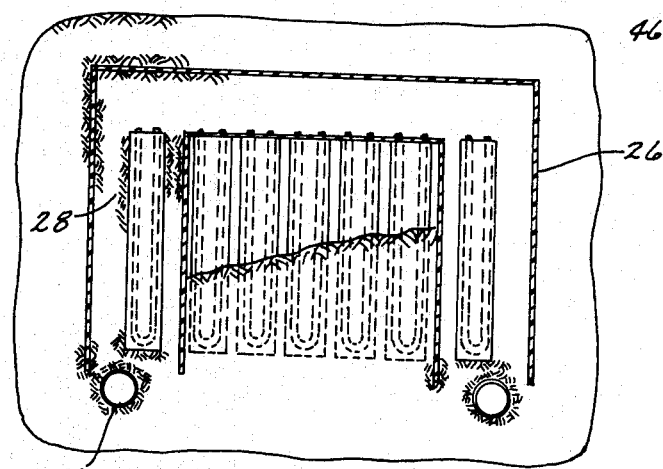
FIG. 3 is an elevated sectional view along line 3—3 of FIG. 2.
Figure 4:
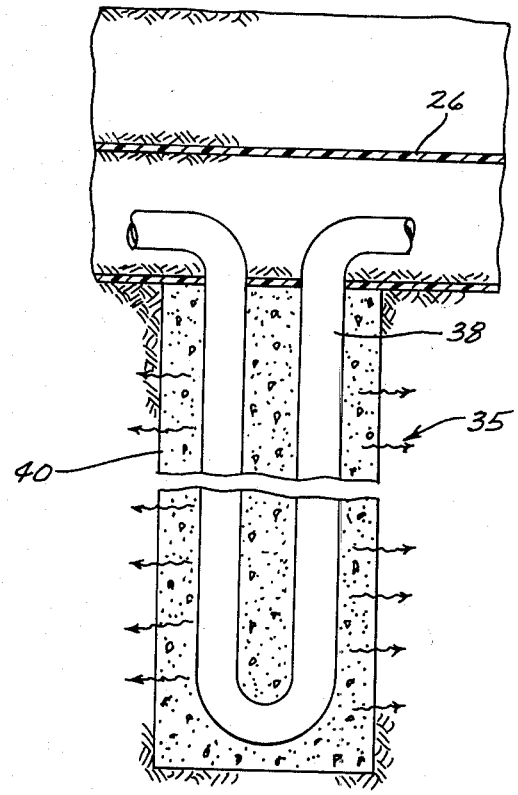
FIG. 4 is an elevated sectional view showing in detail one of the channels employed in the invention.

Looking first at FIGS. 2, 3 and 4, the heat storage sink, referred to generally as 10, is constructed by digging a large perimeter trench 12 which defines a large block of earth material 14 having a top surface 16 and vertical side walls 18, 20, 22 and 24. In order to provide an insulative barrier, side walls 18, 20, 22 and 24 and the outer wall, defined by trench 12, are covered with a moisture impervious material, such as a vinyl coating 26. It is, of course, to be understood that vinyl coating 26 is shown as exemplary only and any moisture impervious sheet like material can be used, for example polyethylene sheeting, or the like. Importantly, trench 12 is, after covering its side walls with vinyl coating 26, filled with dry particulate earth material 28. Dry particulate earth material 28 is important in that it provides an effective insulative barrier to prevent heat loss outwardly from earth block 14. For example, the K value of dry earth is about 0.032 and for example urethane foam has a K value of about 0.011. Both of these are measured on a per foot basis.

Extending downwardly into earth material block 14 are a plurality of channels, or bores, 30. As can be seen in FIG. 2, the channel bores 30 are arranged in two groupings. A first grouping, designated for illustrative purposes as 32, defines an outer zone and a second series of channel bores represented at 34 defines an inner zone, which for illustrative purposes, is shown with an inner zone boundary 36.

Each of vertical bores 30, both in inner zone 34 and outer zone 32, are filled with a heat exchange member which comprises a U-shaped conduit 38 embedded in concrete 40, with, of course, the concrete being shaped for matingly fitting within bore 30.

Each of the heat exchange members 35 (see FIG. 4) in the outer zone 32 are connected in parallel by suitable conduit and associated couplings which, since its use is well known and does not form a part of this invention it is only depicted schematically. However, it is important that heat exchange members 35 be connected in parallel, as opposed to series, in order to obtain maximum heat transfer efficiency. Heat exchange fluid entering outer zone inlet 42 as depicted by arrow 44, splits at T intersection 45 into two equal flow streams. The first stream enters line 47. Cross overs 49 carry a portion of the flow through each heat exchanger 35 in outer zone 32 where it enters line 51, and from there to return line 46 for return to the collector.

In like manner the second flow stream from T intersection 45 flows into line 53, through corresponding cross overs 49 to return line 55 and back to return line 46 where its flow joins with the first stream for return to the collector. As can be seen, the total flow path for each of the split portions is equal, and since the flow pipes of each are of the same dimensions, total resistance is equal which allows for uniform and equal flow through both paths.

In like fashion, each of the heat exchange members 35 of inner zone 34 are connected in parallel fashion so that heat exchange fluid passing into inner zone 34 as indicated by directional arrow 48 may enter through entrance conduit 50, pass in parallel fashion through each of heat exchange members 35 of inner zone 34 and thence outwardly through inner zone exit conduit 52 as indicated by directional arrow 54. Inner zone 34 is connected in identical flow patterns as shown for outer zone 32, but for sake of conciseness on the entrance, and exit lines are schematically illustrated.

The piping, or conduit members for passage of the heat exchange fluid, may be made of any suitable heat exchange metal, such as steel, aluminum, copper tubing, or the like. The only important criteria is that it be a suitable heat exchanging metal.

It therefore can be seen that heat exchange fluid can be passed, at the user's option, into either peripheral zone 32 or inner zone 34, and likewise may be selectively withdrawn from either inner zone 34 or outer zone 32.

After complete installation of heat sink 10 in the manner herein previously described, for insulative purposes the top surface 16 is completely covered with dry particulate earth material, generally from two to four feet in thickness, in order to provide an insulative, cheap and inexpensive heat transfer barrier. This prevents outward heat loss to the atmosphere.

As seen in FIG. 3, at the bottom of perimeter trench 12, if desired, the trench may be suitably tiled in order to drain away moisture. Drain tiles 56, may have an associated sump pump in the event that the heat sink 10 is constructed in an area of a high water table.

Figure 1:
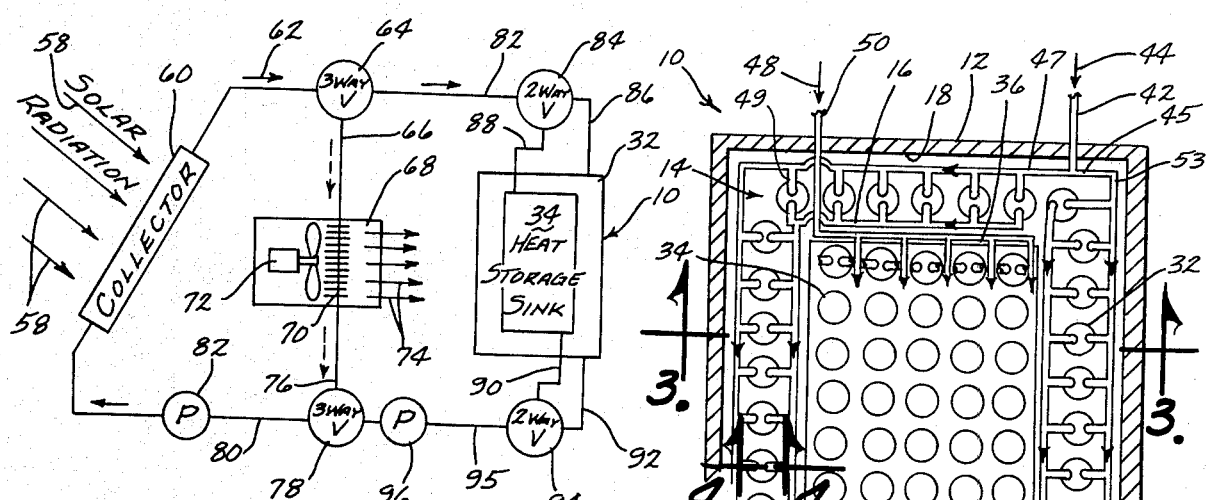
FIG. 1 is a schematic view showing how the heat storage sink of this invention fits within an overall solar collection heating system.

Looking now at FIG. 1, the operation of heat sink 10 in an overall solar collection system for use with a building structure, will be shown schematically.

Solar radiation, depicted by arrows 58 hits solar collector 60. Solar collector 60 may be of any desired construction, the only criteria being that it be a solar collector which employs a heat transfer fluid. Such collectors are well known and do not form a part of this invention so will not be described in detail herein. The heat exchange fluid which may be used in such collector 60 may be any heat transfer medium such as water, water glycol mixtures, or the like. Heat exchange fluid passes through solar collector 60, in the direction depicted by arrow 62 into a three-way diverting valve of conventional construction 64. If heating is desired, the hot fluid is directed from valve 64 into line 66 and into the building structure, depicted as block 68. Within the heating space to be conditioned, represented by block 68, a conventional heat exchange means depicted at 70 is shown and blower fan 72 is used to blow warmed air into the heating structure and pass it therethrough as represented by directional arrow 74. The now cool heat exchange fluid passes out of the building structure 68 via line 76 to a second three way valve 78 and from there back via line 80 to solar collector 60. Pump 82 represented on line 80 is, of course, shown to provide the power source for driving of the heat transfer fluid. The mode of operation just described represents the situation where the collected solar heat is all used for heating demand within building structure 68.

However, in times when heating is not needed, such as summer days, the heat exchange fluid passes through three way valve 64, into line 82 and a first two way valve 84. From two way valve 84, depending upon which lines are open or closed, the hot heat exchange fluid may be passed into peripheral zone 32 via line 86, or alternatively into inner zone 34 via line 88. In like manner, withdrawal from the heat storage sink 10 may be selectively made from inner zone 34 via exit line 90, or from outer zone 32 via exit line 92. Lines 90 and 92 both lead to two way valve 94, line 95 and pump 96. Appropriate opening and closing mechanisms, for directional flow settings of each of the three way and two way valves are well known and do not form a part of this invention and will not be described herein. It can, however, be seen from the schematic shown in FIG. 1, that hot heat exchange fluid may be selectively diverted into the home, back to the collector, or alternatively from the collector to the heat storage sink 10, and within heat storage sink 10 selectively directed to the outer zone 32 or the inner zone 34. In like manner, withdrawal from heat storage sink 10 can be selectively made from either inner zone 34 or outer zone 32 at the user's option.

An important aspect of this invention is that it has been found critical in every instance to provide, when the system is operating in the heat storage mode, for transfer of hot heat exchange fluid into the inner zone 34 of the heat storage sink 10, and when heat is passed from the stored position in heat storage sink 10 through three way valve 78 and line 70 into the existing building structure 68 to always withdraw heat selectively in the first instance from outer zone 32. Only after the heating demand cannot be met by stored heat from outer zone 32 is heat then withdrawn from inner zone 34. The importance of selective withdrawal on a first basis from outer zone 34, and selective storage on a first basis in inner zone 34 is for the following reason. A temperature gradient will always be maintained in this manner between inner zone 34 and outer zone 32, with inner zone 34 being the hottest. The greatest potential for heat loss is from outer zone 32 and thus stored heat is initially removed therefrom before significant heat loss can occur. In addition, outer zone 32 itself acts as a somewhat insulative barrier to prevent outward heat loss via convection from the hotter inner zone 34. In this manner, heat loss is minimized.

As can be appreciated, if one desires the heat sink 10 can be used as cold storage for effective cooling transfer. Thus, at the user's option, such a system may be used for home cooling.

It can therefore be seen that numerous advantage exist from the use of this system. It stores surplus heat from the solar collector in the summer and early fall for use in winter months when the collector is unable to supply its daily heat needs. The system utilizes an undisturbed block of soil as a heat sink without expensive construction. The temperature gradient maintained within the block of earth material 14 allows for two zone temperature storage in the inner zone and the outer zone and this increases the collector efficiency while at the same time reduces perimeter heat losses from the heat sink. Dry soil, which is kept dry by vinyl barrier 26 acts as an effective and cheap insulation, both on the sides of the block of earth material 14 and on its top surface. The drain tile 56 around the perimeter of the block of earth material 14 effectively directs surplus water away from the soil, allowing it to maintain its dry state and its effective heat storage capacity in that state. Thus, as can be seen, an inexpensive heat storage sink and method of use of the same has been provided.

What is claimed is:

1. A storage system for heat and cold and exchange with a fluid from a solar collector, comprising,
a large block of earth material having a top surface, and vertical side walls, said side walls being defined by a perimeter trench adjacent said side walls, said perimeter trench being lined with moisture impervious material and filled with dry, particulate earth material, an outer zone of vertical channels extending into said block of earth material, and an inner zone of vertical channels extending into said block of earth material, and filling each of said channels, a U-shaped conduit embedded in concrete material and connected for parallel passage of heat exchange fluid with the other U-shaped conduits of said zone to provide heat exchange between said fluid and said block of earth material.

2. The storage system of claim 1 wherein the top surface of said block of earth material is covered with dry particulate soil.

3. The storage system of claim 1 wherein the bottom of said trench is tiled to provide selective drainage of water away from said block of earth material.

4. The storage system of claim 1 wherein each of said outer zone and inner zones are further defined as having a fluid inlet which splits the flow into two co-equal flow streams, with each of said streams providing uniform and equal flow to about one-half of the conduits of said zone.

* * * * *